Patented Oct. 2, 1951

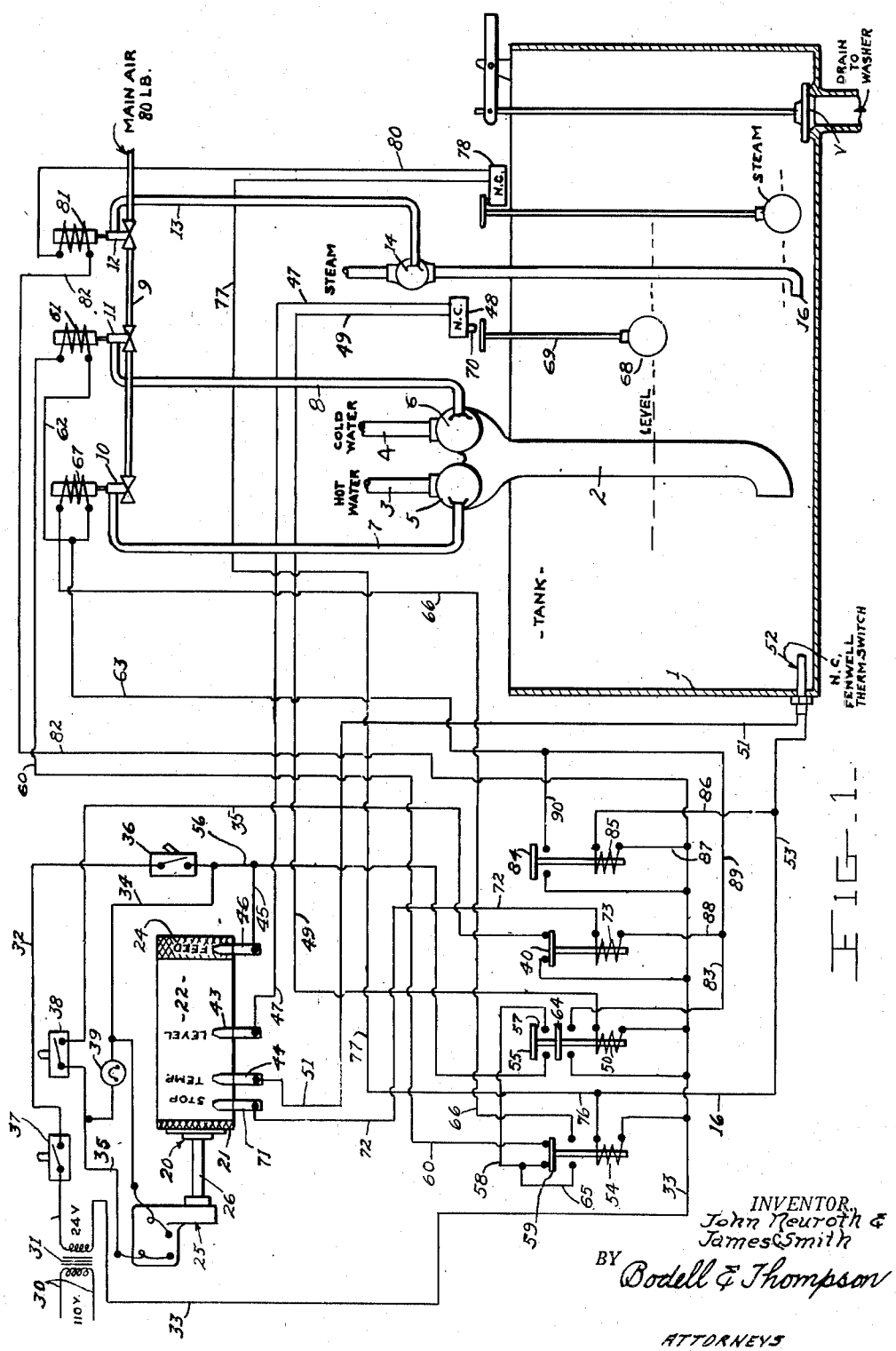

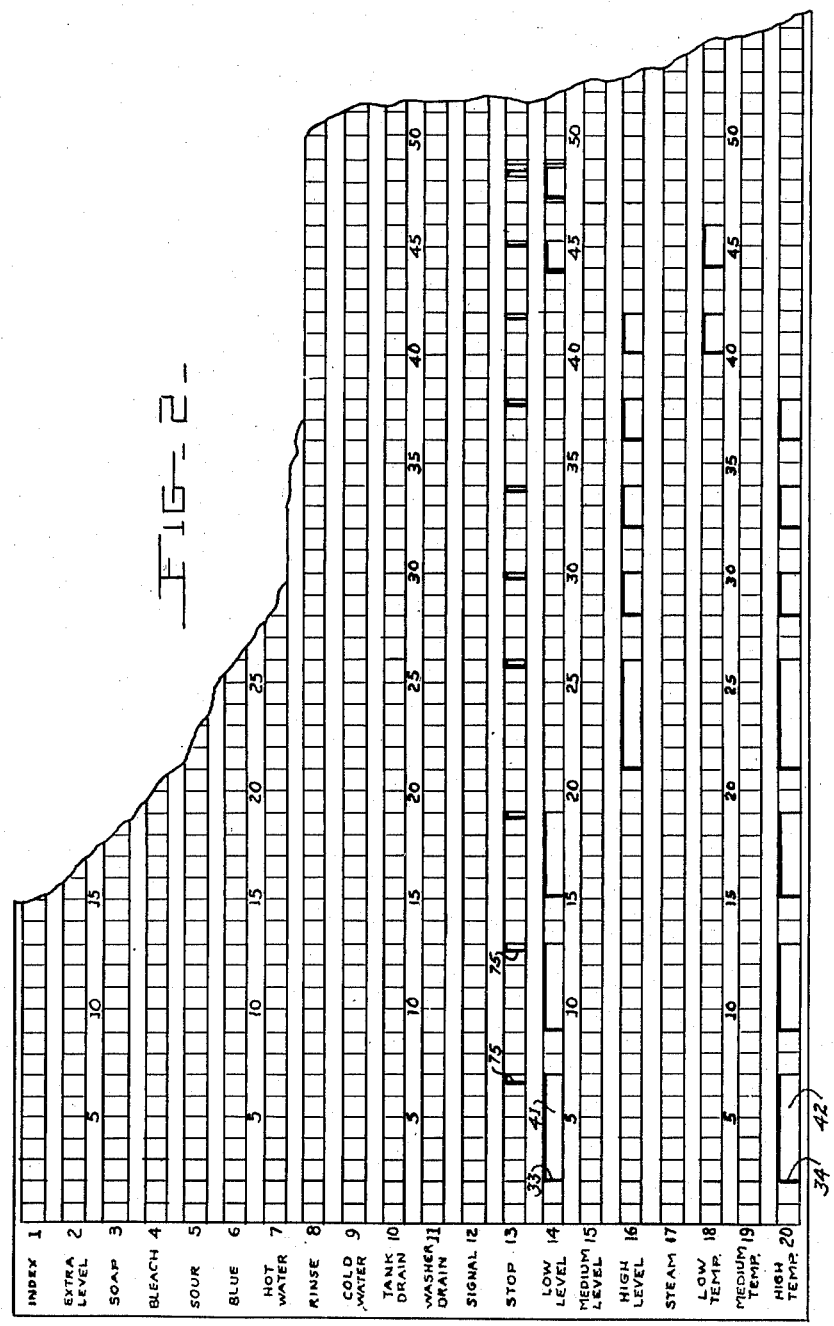

2,570,148

UNITED STATES PATENT OFFICE 2,570,148

WATER LEVEL AND TEMPERATURE CONTROL SYSTEM FOR WASHING MACHINES

John Neuroth and James C. Smith, Syracuse, N. Y., assignors to The Prosperity Company, Inc., Syracuse, N. Y., a corporation of New York Application March 31, 1950, Serial No. 153,068

2 Claims. (Cl. 137—68)

This invention relates to cycle timer controlled systems for laundry washing machines. The control systems of washers, control the water inlet, the water temperature, the level of the water throughout the washing cycle, as well as other operations, such as delivery of measured quantities of soaps or solvents at predetermined timed intervals during the washing cycles, as well as the delivery of other ingredients as bleach, sour, bluing etc., agents, and other operations. The rate of flow of the water varies or is not uniform in different localities and in the same localities, and also in the same laundry. Hence, the time required to fill the water to predetermined levels is constantly varying. The predetermined temperature required is that of the entire body of water at the selected level.

For control systems of the general type on which this invention is an improvement, see Zimarik Patent No. 2,302,923, November 24, 1942. The timer is of the general type shown in Hutchings Patent No. 2,055,031, September 22, 1936, except that it is of the drum type. It consists of a drum rotated by a synchronous electric motor and a series or row of contacts coacting with a conductor on the periphery of the drum, the contacts being controlled in engaging the conductor by formula devices, as slots in a formula sheet, over the conductor. The contacts are connected in branch circuits which control the energization of electro-responsive devices, solenoids, relays, etc., which operate water and steam valves.

The object of the invention is a cycle timed control system having water level and temperature control circuits and a stop motor circuit so correlated as to stop the timer motor during the flowing of the water into a vat, or a mixing tank of the washer, until both the selected level and the selected temperature have been reached, and to again start the timer motor when both the selected temperature and level are reached, but not to stop the timer if both temperature and level are reached in the allotted time, as indicated by the temperature and level slots in the formula sheet.

In the drawing, only that portion of the timer which controls the flow of water into a mixing tank and the level and temperature of the water is shown, the circuits controlling the dispensing of washing ingredients, the operating of the dump valve of the washer etc., being omitted. The mixing tank may be the vat of the washing machine. It is here shown as separate from the vat of the washing machine.

The invention consists in the novel features and in the combinations and constructions hereinafter set forth and claimed.

In describing this invention, reference is had to the accompanying drawing in which like characters designate corresponding parts in all the views.

Figure 1 is a diagrammatic view of the circuits for effecting the stopping of the timer motor and the control by the selected level and temperature of the water in the tank or vat.

Figure 2 is a fragmentary plan view of the washing formula sheet of the timer with the slots cut therein which are pertinent only to the stopping of the timer and their relation to the level and temperature slots.

In the drawing, 1 designates the vat or mixing tank having an inlet pipe 2 for water, the pipe 2 having branches to which are connected pipes 3, 4, leading from sources of hot and cold water. Insofar as this invention is concerned, it is immaterial whether the inlet is for cold water only in view of the fact that the water is tempered in the tank by the injection of the steam. The flow of water is controlled by valves 5, 6, operated to, and held in, open position by air operated devices through branch pipes 7 and 8 of a main air supply line 9, and valves 10 and 11 between the main pipe 9 and the branch pipes 7 and 8. The valves 10 and 11 are of any well known type of two-way, or combined intake and exhaust valves. When the valves 10, 11, are in one position, the valves open the pipes 7 and 8 to the intake of air from the supply pipe 9. When the valves 10 and 11 are in closed position, they close the pipes 7 and 8 to the intake of air from the supply pipe line 9 and open the pipes 7 and 8 to the exhaust of air. The pipes 7 and 8 supply compressed air to devices as diaphragms which mechanically open the valves 5, 6. The valves are self-closing.

A valve 12, similar to the valves 10, 11, connects the air supply pipe 9 through a pipe 13 leading to an air operated device for opening a valve 14 in a steam supply pipe 15, the pipe 15 having a jet outlet 16 in the lower part of the tank 1. The steam is a heating medium for heating the water in the tank 1 to a selected temperature. The tank 1 has a drain or dump valve V operated by the timer. The operation of the valve V per se forms no part of this invention.

The numeral 20 designates the cycle timer as a whole, this comprising relatively movable elements, one being the support for the formula device or sheet, and the other a row of contacts for coacting with a conductor on the support through slots in the formula sheet. As shown, one element is a rotatable drum 21 about which the formula sheet 22 is wrapped, and the other element the series of contacts which register with slots in the formula sheet 22 as the slots are brought into registration with the contacts during the rotation of the drum. The drum has a facing 24 of a conductive material, as copper screening, common to all the contacts. The drum is rotated by an electric motor 25 connected through a reduction gearing to the shaft 26 on which the drum is mounted. The sheet is merely a device for selectively closing and opening circuits through the contacts. Any other form of timer and formula device may be used in carrying out the invention.

The row of contacts contains a contact for each operation appearing on an end margin of the formula sheet, Figure 2, that is, contacts, measuring and dispensing means for soap, bleach, sour, etc., but in Figure 2 only the slots are shown in the rows designated "Stop," "Low Level," and "High Temperature" necessary to show the relative arrangement of the slots to stop the timer until the selected level and the selected temperature are reached. No slots are shown in the medium level and in the medium and low temperature rows or columns, as the relative arrangement of these slots to the slots in the "Stop" column is the same as in the low level and high temperature columns. In other words, in Figure 1 only the parts are shown necessary for the operation of stopping the timer only prior to the time a selected water level and also a selected temperature are reached and for restarting the motor when both level and temperature are reached.

There are usually a low temperature switch, a medium temperature switch, and a high temperature switch in the tank, and a low level, a medium level, and a high level switch opened by floats, one for each, in the tank. Each temperature switch and level switch has its own contact closed by the timer.

In Figure 1, only one temperature switch and one float operated level switch are shown. Also, insofar as stopping the timer motor until both a selected temperature and a selected level are reached, and then starting the motor, are concerned, there may be but one water inlet valve instead of hot and cold water valves.

The numeral 30 designates the supply wires which, through a transformer 31 supply a main circuit comprising legs 32, 33. The leg 33 may be, for convenience of explanation, considered a return line. 34 and 35 are the legs of the circuit for the motor between the legs 32, 33, of the main circuit, the leg 32 having a manual switch 36 therein. There are push button switches 37, 38, in the legs 32, 35, respectively, which are closed by the closed cover, not shown, of the casing for the timer. There is a signal lamp 39 connected across the legs of the motor circuit. The motor circuit leg 35 has a cut-out switch 40 therein, to be described.

In the general method of operation, the water is first allowed to flow into the tank to a level above that of the steam jet 16. When the float reaches the selected level, it opens the level switch so that the water inlet valve closes. When the temperature of the water reaches a selected temperature, the normally closed thermal switch in the tank opens. At any time that the temperature of the water drops below the selected temperature before the level is reached, the temperature switch closes and steam is injected to raise the temperature to the selected temperature, the temperature and the level switches being controlled by the temperature and level contacts and their slots in the formula sheet. The hot water valve may also open if the water temperature in the tank drops below the selected temperature before the selected level is reached. The steam is used primarily to raise the water temperature to the selected temperature when the selected level is reached. It may be used secondarily to momentarily agitate the water to mix a powdered ingredient dumped into the water. In this case, there is a steam contact in the row of contacts coacting with a slot in the formula sheet which alines with the steam contact when another slot alines with a contact controlling the dispensing of the ingredient. The main feature lies in stopping the timer motor when either or both selected level in temperature is not reached before the formula slots pass the contacts and again starting the motor when both selected water level and temperatures are reached. The row of contacts includes level temperature, and motor stop contacts, and the operation is dependent on the relative location of the slots or other formula devices for closing the contacts to each other.

In the operation of the specific construction here shown, the level and temperature slots 41, 42 of the formula sheet 22 register with the level and temperature contacts 43, 44, simultaneously and travel along the contacts 43, 44, establishing circuits through the contacts from the main feed wire 32, manual switch 36, wire 45, to the feed in contact 46, conductor 24 of the timer, to the contacts 43, 44, from the contact 43 through wire 47, normally closed water level switch 48, wire 49, to electro-magnetic coil 50, to return wire 33, through switches, to be described, in series with the level switch and the temperature switch in the tank, respectively, and from temperature contact 44, wire 51, to closed temperature sensitive switch 52 in the tank, wire 53 to electro-magnetic coil 54, thence to the return leg 33 of the feed circuit. The coil 50 is the coil of a magnetically operated water relay switch 55, and the energization of the coil 50 closes a circuit from the main line 32 controlling the operation of valves which control the flow of water into the tank through the intake pipe 2. These circuits are as follows:

From the leg 32 of the feed circuit, wire 56, to one bridge 57 of the relay switch 55, through wire 58 and through another normally closed bridge of a temperature relay switch 59 operating, as will be presently described, thence through wire 60, through a magnet or solenoid coil 61, thence through wires 62, 63, to a second bridge 64 on the level relay switch 55 to the return wire 33. The energization of the solenoid coil 61 opens the air valve 11, permitting air to flow to open the cold water valve 6. However, the energization of the coil 54 of the temperature relay switch 59, this operation of the switch being because the temperature switch 52 in the tank is closed, causes the switch 59 to break the circuit to the solenoid for the cold water valve and completes the circuit from the wire 58 which connects the switches 55 and 59, through the wire 65, across the bridge of the switch 59 to wire 66, thence to the coil 67 and wire 68 to the switch 55, which is closed by reason of the coil 50 being energized because the selected level has not yet been reached, and then to the return wire 33. Thus, at the start hot water enters the tank 1 through the inlet pipe 2. If the temperature of the hot water is hotter than the selected temperature, the temperature switch 52 will open and the cold water solenoid 61 be energized by reason of the relay switch 59 being deenergized because the temperature switch 52 opens and the cold water solenoid 61 will be energized and cold water flow into the tank. This fluctuation, due to the opening and closing of the temperature switch 52 in the tank, may take place off and on until the selected level is reached.

As the water flows into the tank 1, it lifts a float 68 in the tank which, through a rod 69, engages the operating member 70 of the level switch 48 when the selected level is reached, and thus opens the switch 48 so that the circuit controlled by the level contact 43 is open. Assuming that the selected temperature is not reached when the selected level is reached, or the selected level is not reached when the selected temperature is reached, the timer motor is stopped through a circuit as follows: Stop contact 71, wire 72, to a solenoid coil 73, which operates the motor cut-out switch 40, this switch normally connecting the leg 35 of the motor circuit to the return leg or ground wire 33. When however, the solenoid coil 73 is energized, the circuit through the motor stop switch 40 is opened and hence, the motor stopped. It opens because it engages its slot 75 in the formula sheet, this slot being located in position to be engaged by the contact 71 when the timer drum has rotated far enough so that the contacts 43 and 44 approach the end of their slots 41, 42, and hence all three contacts 43, 44 and 71 are at the end of their slots with respect to the direction of rotation of the drum of the timer. Thus, the timer stops when the temperature is below the selected temperature but the water is up to the selected level, or when the water temperature is up to the selected temperature and the level is not up to the selected level. Thus, when the temperature is below the selected temperature but the water is up to the selected level, the circuit through the temperature contact 44 is closed through the temperature switch 52 in the tank, and also through the solenoid coil 54 of the switch 59 although, of course, no water can flow but the current passes from the wire 53 leading from the temperature switch 52 in the tank through wire 76, wire 77, to a stem switch 78 which is at the start closed, but is opened by a float 79 in the tank, through wire 80, to the solenoid coil 81 of the steam valve 12 which, when opened to the inlet of air through the pipe 9, permits air to open the steam valve 14. The circuit is completed from the coil 81, through wire 82, to the return wire 33. Thus, when the temperature valve 52 in the tank opens under a selected temperature, the steam valve 14 closes as the solenoid 81 is deenergized. However, at this time, as the water is at the selected level, no water is passing into the tank 1. When the water level relay switch 55 opens, or is deenergized, the return wire 83 from the solenoid coil 73 of the motor cut-out switch 40 is deenergized but because the temperature has not been reached, it is necessary to hold the cut-out switch 40 open. It is held open through a branch circuit controlled by the temperature switch 52 in the tank.

84 designates a cut-in switch for grounding the solenoid coil 73 of the motor cut-out switch, when the water relay switch 55 is open, its coil 50 being deenergized. 85 designates the solenoid coil for closing the switch 84, this coil being connected by a wire 86 to the wire 53 leading from the temperature switch 52 in the tank and connected to the return wire 33 through a wire 87. Thus, whenever the temperature switch 52 in the tank is closed, the switch 84 is closed and therefore, when the water relay switch 55 is open and the motor cut-out switch 40 is also opened, but the temperature switch 52 in the tank closed, then the solenoid winding 73 of the motor cut-out switch is grounded through the wires 88, section 89 of wire 83, wire 90, and closed switch 84. When however, the selected temperature is reached and the circuit broken through the temperature switch 52 in the tank, both grounds for the solenoid 73 of the motor cut-out switch, through water relay switch 55 and the switch 84, are broken so that the motor cut-out switch can return to closed position and start the motor and the timer drum.

Of course, if the selected temperature is reached, off and on, before the selected level is reached, the motor cut-out switch, if open, will remain open while the level switch 48 for the tank 1 is closed, or before it is opened by the float 68 as the ground for the solenoid 73 of the motor cut-out switch 40 is grounded through the water level relay 55, and also the steam valve solenoid 14 will be controlled as before until both the selected water level and temperature are reached.

In operation, as the timer drum rotates, the water and temperature slots of the formula sheet register with the level and temperature contacts 43, 44, simultaneously, and when the slots are about to clear the contacts, the stop slot registers with the stop contact 71 and energizes the motor cut-out switch 40 to open the motor circuit. If and when the water level and temperature are at the selected level and temperature at the same time, no circuits controlled by the level and temperature switches 48, 52 will be closed, and the circuit through the solenoid 73, which opens the motor cut-out switch 40, will be opened. Hence, the motor, if stopped, will restart.

The underlying idea of this invention is the coil 73 in the circuit closed by the timer through the timer by the stop contact 71, the coil being grounded through two paths, one path through the water relay switch 55 when closed, and the other path through the steam cut-in switch 84 when closed, the water relay switch controlling the opening of the water inlet valves for the tank, and itself being controlled by the water level switch 48 for the tank 1 and closed only when the level switch is closed and the steam cut-in switch 84 being closed by the coil 85 in the circuit of the temperature switch 52 in the tank between the temperature switch 52 and the return wire 33 of the feed circuit and hence energized only when the temperature switch 52 is closed, the circuit in the temperature switch 52 in the tank 1 controlling the opening of the valve 14 in the steam jet pipe 15 through the closed steam valve 78 and circuit for the solenoid 81 which opens the air valve 12. Hence, the circuit to the steam switch is closed only when the temperature switch 52 in the tank is closed.

What we claim is:

1. A water level and temperature control system for tanks comprising a cycle timer having a movable element, a row of contacts, a formula device on said element to open and close branch circuits through the contacts, the row of contacts including a level contact, a temperature contact and a motor stop contact, a main feed circuit in circuit with a conductor on the movable timer element common to all the contacts through the formula device, a motor for the movable timer element, a circuit therefor, level and temperature circuits from the level and temperature contacts respectively, a normally closed level switch in the level contact circuit opened by float means in the tank, a normally closed temperature switch in the tank connected in the temperature contact circuit, a normally closed motor cut-out switch in the motor circuit, an electro-magnetic coil in the stop contact circuit to open, when energized, the cut-out switch, a normally open steam control switch, the steam control switch being in series with the temperature switch in the tank, a normally open water relay switch having means for closing a circuit from the feed circuit to electro-magnetic means which control the opening of a water intake valve in a pipe discharging into the tank, and also having means for closing one ground wire of the magnetic coil of the motor cut-out switch, an electromagnetic coil in series with the level switch arranged, when energized, to close the water relay switch, a second grounding wire for the coil of the motor cut-out switch having a normally open switch therein, an electro-magnetic coil for closing the last switch in series with the temperature switch in the tank, the steam control switch circuit having an electro-magnetic coil therein for opening a valve which controls the opening of a steam valve in a pipe discharging into the tank, the formula devices of the timer being located to close and open the level and temperature contacts simultaneously at predetermined times, and to close the motor stop contact, and stop the timer motor when the level and temperature contacts are closed and about to be opened by the timer when at least one of the level and temperature switches is closed.

2. The control system of claim 1 in which there is a temperature relay switch which is cut into a circuit by the water relay switch when operated, the temperature relay switch normally closing the circuit of an electro-magnetic coil for the opening of a cold water valve in the inlet into the tank and when in operated position, to close the circuit controlling the electro-magnetic coil which controls the opening of a hot water valve of the inlet pipe into the tank, the temperature relay switch being operated by a coil in the return line from the temperature switch in the tank.

JOHN NEUROTH.
JAMES C. SMITH.

REFERENCES CITED

The following references are of record in the file of this patent:

UNITED STATES PATENTS

| Number | Name | Date |
| --- | --- | --- |
| 2,302,923 | Zimarik | Nov. 24, 1942 |
| 2,328,073 | Hanney | Aug. 31, 1943 |